United States Patent
Prohaska

(10) Patent No.: US 6,240,225 B1
(45) Date of Patent: May 29, 2001

(54) TEMPERATURE COMPENSATED FIBER GRATING AND METHOD FOR COMPENSATING TEMPERATURE VARIATION IN FIBER GRATING

(75) Inventor: John Dennis Prohaska, Millbury, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/417,147

(22) Filed: Oct. 12, 1999

(51) Int. Cl.[7] ........................................... G02B 6/34
(52) U.S. Cl. ...................... 385/37; 385/31; 385/147
(58) Field of Search ............................. 385/37, 123, 31, 385/95–99, 147

(56) References Cited

U.S. PATENT DOCUMENTS 5,514,360 * 5/1996 Sleight et al. ...................... 423/593
5,694,503 * 12/1997 Fleming et al. ...................... 385/37
5,721,802 * 2/1998 Francis et al. ...................... 385/42

* cited by examiner

Primary Examiner—Darren Schuberg
Assistant Examiner—Fayez Assaf

(57) ABSTRACT

The present invention provides a temperature compensated optical device which is capable of compensating for the inherent temperature variations of the fiber grating. The temperature compensated optical device includes an optical fiber having a grating therein for reflecting light passing therethrough within a range about a central wavelength and a temperature compensating member affixed to the optical fiber proximate the grating. The temperature compensating member comprises an anisotropic material having a negative temperature expansion coefficient along at least one axis thereof. The optical fiber is aligned at a predetermined angle with respect to the axis to compensate a temperature variation. The invention is used in the field of fiber optic telecommunications.

33 Claims, 5 Drawing Sheets

END VIEW

TEMPERATURE COMPENSATED FIBER GRATING AND METHOD FOR COMPENSATING TEMPERATURE VARIATION IN FIBER GRATING

FIELD OF THE INVENTION

The present invention relates generally to optical fiber grating technology. More particularly, the invention relates to a temperature compensated fiber grating and a method to remove or significantly reduce central wavelength variations of a fiber grating used in fiber optical communication systems caused by the grating's temperature variations.

BACKGROUND OF THE INVENTION

Optical fiber refractive index gratings are widely used in fiber optical communication systems. In particular, fiber Bragg gratings are used as spectral filters for wavelength division multiplexing (WDM) of optical signals. In the WDM systems, it is important that the central wavelength of the filter does not change. However, as the temperature of the fiber Bragg grating rises, the central wavelength fluctuates, typically by 10 pm/° C. Such wavelength variation has a detrimental effect on the performance of the WDM systems.

It is well known that the central wavelength of a fiber Bragg grating varies with temperature by the following expression:

$$\frac{(\lambda - \lambda_0)}{\lambda_0} = K_T(T - T_0)$$

$\lambda_0$ is the wavelength at a grating's temperature $T_0$, and $K_T$ is the thermal expansion coefficient of the fiber Bragg grating. The thermal expansion coefficient of a silica-based fiber Bragg grating has a typical value around $6\sim7\times10^{-6}/°$ C.

In the prior art, there exist several mechanisms to produce temperature insensitivity to the central wavelength of the fiber Bragg grating. The actual amount of compensation required for a particular grating depends on the composition and structure of the grating. One way is to adopt an active system, which depends on a feedback from a temperature active element such as a thermal electric cooler. Another way is to use a passive method. The passive method is more desirable because it does not require power consumption and control logics to maintain a constant wavelength. In one approach, wavelength control under the passive method is accomplished by clamping the fiber containing the fiber Bragg grating with a mechanical structure made of multiple materials with different thermal expansion properties, usually positive thermal expansion coefficients. U.S. Pat. No. 5,042,898 and PCT/US97/23415 provide examples of the multiple materials assembled to produce a compressive strain as the temperature of the package increases. However, these mechanical structures are complicated to fabricate and expensive.

Another approach is to use isotropic materials that have negative thermal expansion coefficients that precisely match the wavelength shift of the fiber Bragg grating. Examples of this approach were presented at the 22nd European Conference on Optical Communication (ECOC'96) in Oslo, by D. L. Weidman, et al. of Coming Inc. and U.S. Pat. No. 5,694,503. The composition of a glass ceramic is designed to have a thermal expansion coefficient which matches the fiber Bragg grating's thermal expansion coefficient. However, the precise control of the thermal expansion of a glass ceramic to a desire level is difficult to achieve. Moreover, the design and fabrication of these exotic materials increase expense and complexity in the production these structures.

SUMMARY OF INVENTION

In view of the desire for temperature compensated fiber Bragg gratings, the subject invention provides for a temperature compensated optical device and a simple tunable method to compensate for the inherent temperature variations of the fiber Bragg grating. Specifically, the present invention allows for selection of the thermal expansion coefficient by placing the fiber with the Bragg gratings on a crystal compensating member at a prescribed angle with respect to a crystal axis that has a negative thermal expansion coefficient.

A temperature compensated optical device according to the present invention comprises an optical fiber having a grating therein for reflecting light passing therethrough within a range about a central wavelength and a temperature compensating member affixed to the optical fiber proximate the grating. The temperature compensating member comprises an anisotropic material having a negative temperature expansion coefficient along at least one axis thereof. The optical fiber is aligned at a predetermined angle with respect to the axis to compensate the temperature variations.

In a first embodiment of the temperature compensated optical device of the invention, the temperature compensated optical device has a fiber Bragg grating with a central wavelength at 1536.310 nm. The temperature compensating member is an anisotropic crystal, for example calcite. The Calcite single crystal is cut into a bar such that the long dimension of the bar (about 10~30 mm in length) has a negative thermal expansion coefficient and the short dimension has a positive thermal expansion coefficient. The optical fiber with the grating is bonded to the calcite by epoxy with the predetermined angle of 0.3 degrees along the direction in the calcite crystal that has a compensating thermal expansion value for a given fiber Bragg grating. It is found that the central wavelength of the temperature compensated optical device of the invention remains substantially unchanged as the temperature of the Bragg grating varies from 24° C. to 170° C.

In a second embodiment of the temperature compensated optical device of the invention, the compensating member has a groove on one of its surfaces. The groove is oriented along the predetermined angle with respect to the axis that has a negative thermal expansion coefficient, and the optical fiber with the Bragg grating is placed inside the groove. The groove may be in the form of a V-groove, a rectangular groove or a rounded groove.

In a third embodiment of the temperature compensated optical device of the invention, the compensating member has a through hole therein along the predetermined angle with respect to the axis having a negative thermal expansion coefficient. The optical fiber is placed inside the hole.

In a fourth embodiment of the temperature compensated optical device of the invention, the optical fiber is bonded on the compensating member by a metal coating layer and a solder.

In a fifth embodiment of the temperature compensated optical device of the invention, the optical fiber is bonded on the compensating member by a low melting temperature glass frit.

BRIEF DESCRIPTION OF THE DRAWINGS

These and other objects, features and elements of the present invention will be better understood from the following detailed description of preferred embodiments of the invention in which.

DETAILED DESCRIPTION OF PREFERRED EMBODIMENTS

Figure 1:
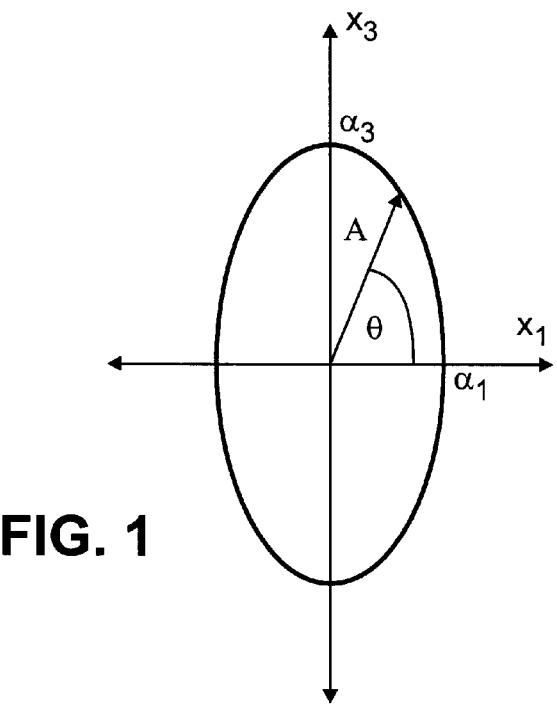
FIG. 1 is a projection of an ellipsoid of a thermal expansion equation of a crystal along one direction.

The invention is accomplished by combining an optical fiber having a fiber refractive index grating therein with an anisotropic crystal having a negative thermal expansion coefficient along at least one of its crystallographic axes. The degree of temperature compensation can be controlled by positioning the fiber Bragg grating at an appropriate angle with respect to the crystal axis which exhibits a negative thermal expansion coefficient.

Specifically, a temperature compensated optical device of the invention comprises an optical fiber having a refractive index grating therein and a temperature compensating member affixed to the optical fiber proximate the grating. The grating reflects light passing through the optical fiber within a range about its central wavelength. The compensating member comprises an anisotropic material having a negative temperature expansion coefficient along at least one axis of the material. The optical fiber is aligned at a predetermined angle with respect to the axis to compensate temperature variations.

The compensating member used in the invention can be made from a wide range of anisotropic materials. It is preferred that the anisotropic material is in the form of a single crystal. One of the advantages of using the single crystal over a polycrystalline ceramic is that large anisotropies in the polycrystalline ceramic lead to high thermal stresses. The thermal stresses are undesirable for temperature compensation of Bragg gratings because they cause micro-cracking along grain boundaries and hysteresis in the thermal expansion behavior. The anisotropic crystals that can be used in the present invention include, but not limited to, $CaCO_3$, $AgGeS$, $AgGeSe$, $AlTiO_3$, $LA_2O_3$, $Nb_2O_5$, $TaVO_5$, $Ta_2O_5$—$WO_3$, $PbTiO_3$, $ZrW_2O_8$, and $HfO_2$—$TiO_2$. More specifically, Table 1 below provides a list of single crystals with anisotropic thermal expansion coefficients.

TABLE 1

| Single Crystals | Normal to c-axis (X $10^{-6}/°$ C.) | Parallel to c-axis (X $10^{-6}/°$ C.) |
|---|---|---|
| $Al_2O_3$ | 8.3 | 9.0 |
| $Al_2TiO_5$ | −2.6 | 11.5 |
| $3Al_2O_3 \, 2SiO_2$ | 4.5 | 5.7 |
| $TiO_2$ | 6.8 | 8.3 |
| $CaCO_3$ | −6 | 25 |
| $SiO_2$ | 14 | 9 |
| C | 1 | 27 |
| AgGaS | −13 | |
| AgGaSe | −7 | |
| $Nb_2O_5$ | −7 | 14 |

As seen, these crystals have negative or positive thermal expansion coefficients along respective single crystal axes. Note however that the scope of the materials used as the temperature compensating material should not be limited to ceramics and crystals. Rather it could also include metal alloys such Mn—Cr alloys or polymers such as polyethylene and poly(p-phenylene benzobisthiazole).

On the other hand, it should be pointed out that combining a fiber Bragg grating with a positive thermal expansion coefficient material could be used to enhance the thermal sensitivity. This enhancement might be desirable for temperature sensing applications.

The alignment of the optical fiber having the fiber Bragg grating therein with respect to an axis of the compensating member having a negative thermal expansion coefficient is based on the following theory. In general, the thermal expansion properties of an anisotropic crystal is described by a quadric equation such as $$\alpha_{ij} x_i x_j = A$$

wherein A represents the thermal expansion coefficient, $x_i$ and $x_j$ are dimensional variables with respect to the crystal axes, and $\alpha_{ij}$ is a coefficient of thermal expansion tensor for the anisotropic member. The shape and orientation of the quadric is subject to restriction imposed by crystal symmetry according to Neumann's Principle.

In the case of calcite, which is a crystal with trigonal symmetry, $\alpha_{ij}$, the coefficient of thermal expansion tensor looks like $$\alpha_{ij} = \begin{pmatrix} \alpha_1 & o & o \\ o & \alpha_1 & o \\ o & o & \alpha_3 \end{pmatrix}$$

The thermal expansion equation takes the form of an ellipsoid of revolution in three dimensions. When the crystal is cut along an appropriate crystal direction, then the ellipsoid is projected onto a plane to form an ellipse as shown in FIG. 1. The major and minor axis intercepts are the values of the thermal expansion coefficients along the principle axes. The value of the thermal expansion coefficient, A, at any arbitrary angle in that plane is the distance from the origin to the perimeter of the ellipse.

The quadric equation takes the form:

$$\alpha_1 x_1^2 + \alpha_3 x_3^2 = A$$

The quadric equation can be rewritten in terms of the angle $\theta$ is FIG. 1 as $$A = \alpha_1 \cos^2(\theta) + \alpha_3 \sin^2(\theta)$$

The above equation provides an expression for the thermal expansion coefficient along any arbitrary direction in the plane of a cut piece calcite. If the thermal expansion coefficient values for calcite are applied (−6 & +25×10$^{-6}$/° C.), then one finds that the angle at which there is zero thermal expansion occurs at about 65 degrees. If an angle of 10° is selected with respect to the axis (x1) along the negative expansion direction then the thermal expansion coefficient in that direction is ~−5×10$^{-6}$/° C. This demonstrates the tuning effect for the thermal expansion coefficient in an anisotropic crystal.

Epoxy can be a suitable bonding agent for affixing the fiber to the compensating member. One example of the epoxy that transfers the compensating member strain to the fiber and operates over an acceptable temperature range is (Tra-Con's 45 Wiggins Av Bedford, Mass.) TRABOND 221H01 epoxy. This epoxy is a room temperature curing adhesive, which minimizes thermally induced strain between the compensating member, the fiber Bragg grating and the bonding layer formed during the cure process. A low thermal expansion (3.5 ppm/C) epoxy is also useful for reducing stress between the fiber and the compensating member. A UV curable adhesive or resin is also a workable bonding agent which will also minimize thermally induced strains between the fiber grating, the bonding layer and the compensating member. A moderate viscosity (5000 cps) epoxy is advantageous for mounting the fiber grating to the substrate. Air bubbles in the bonding agent (epoxy) should be removed to reduce transverse strains on the grating which lead to chirping and grating spectrum distortion. A high glass transition (Tg>=71° C.) temperature is also advantageous to extend the operating range of the device.

Figure 2:
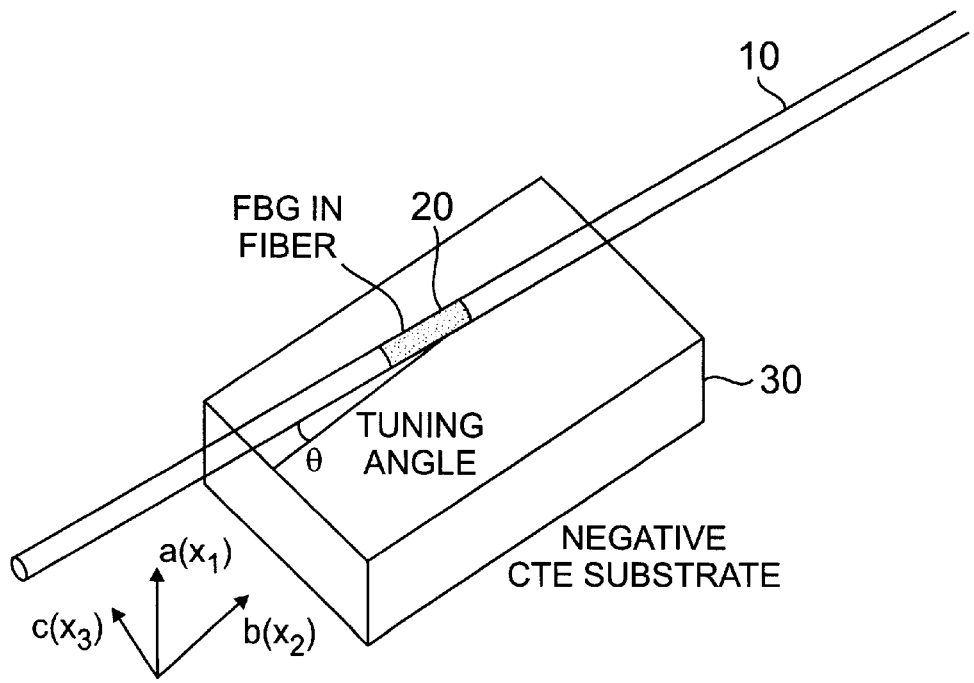
FIG. 2 is a schematic illustration of a temperature compensated device in accordance with a first embodiment of the present invention.

A first embodiment of the temperature compensated optical device is now described. Referring to FIG. 2, a length of optical fiber 10 having a fiber Bragg grating 20 is bonded using epoxy adhesive to a thin bar of calcite 30 whose c axis is perpendicular to the long dimension of the bar. The thin bar has typical dimensions of 10~100 mm long×1~10 m thick×1~10 mm wide. The bonding adhesives could also be a low melting point glass or metallic solders instead of epoxies. The precise angle with respect the long dimension of the bar determines the exact amount of compensation given to the fiber Bragg grating.

Figure 3:
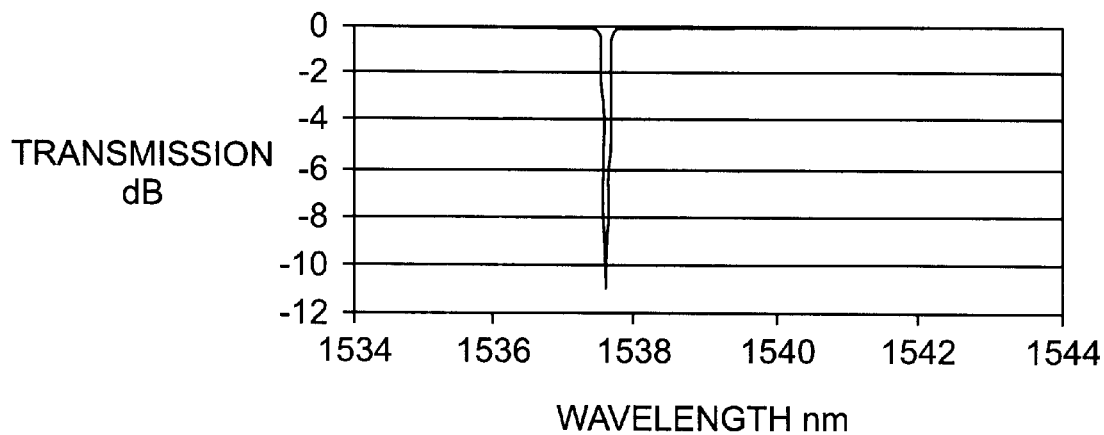
FIG. 3 depicts a transmission spectrum of the fiber grating used in the temperature compensated device in accordance with the first embodiment of the present invention.

The fiber Bragg grating thermal coefficient varies somewhat due to waveguide designs and material properties. In this case, a 10 mm long Bragg grating is made of SpecTran's Photosil type c fiber at 1536.310 nm. The transmission spectrum of the grating is shown in FIG. 3. The grating was bonded to the face of the long dimension of the calcite crystal at an angle of 0.3 degrees. Tracon epoxy with a glass transition temperature of 70° C. is used to bond the fiber Bragg grating to the substrate bar.

To validate the package design and the invention, the following experiment is performed. The transmission spectrum of the fiber Bragg grating in the package is measured using a broad band light source and an optical spectrum analyzer with a resolution of 15 pm. The transmission spectrum of the fiber Bragg grating is measured for temperatures between 24° C. and 170° C. The upper temperature limit for this package is determined by the choice of epoxy used. The temperature range could be extended if a higher glass transition epoxy is used. The transmission spectrum in FIG. 3 remains essentially unchanged in the compensated package.

Figure 4:
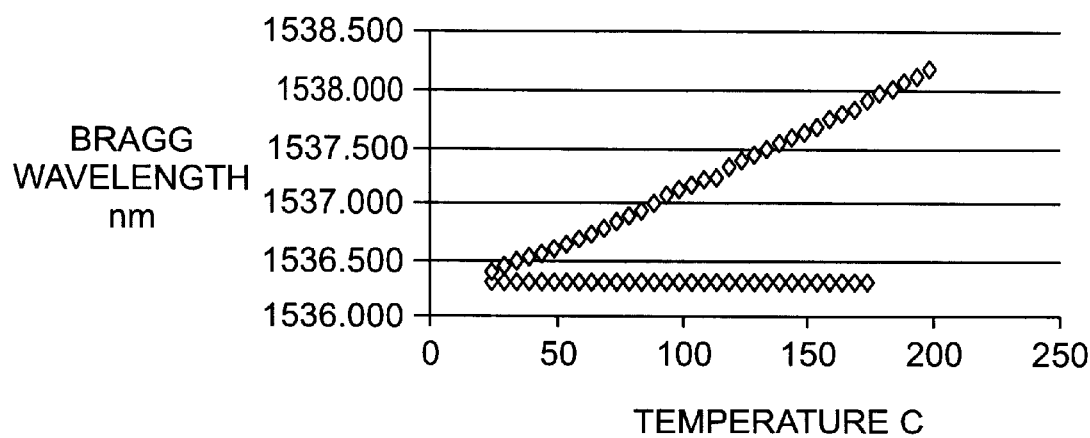
FIG. 4 depicts comparative results of wavelength variations caused by the temperature variations between the temperature compensated device of the first embodiment of the present invention and a fiber Bragg grating without any compensation.

FIG. 4 provides experimental data comparing the temperature compensated optical device of the first embodiment with a similar fiber Bragg grating without the use of the anisotropic crystal of calcite. When the anisotropic crystal of calcite is used, the central wavelength of the fiber Bragg grating remains almost unchanged at 1536.310 nm as the temperature of the fiber Bragg grating is raised. On the other hand, the fiber Bragg grating without the anisotropic crystal has its central wavelength drifting away from its initial wavelength as the temperature increases.

Figure 5:
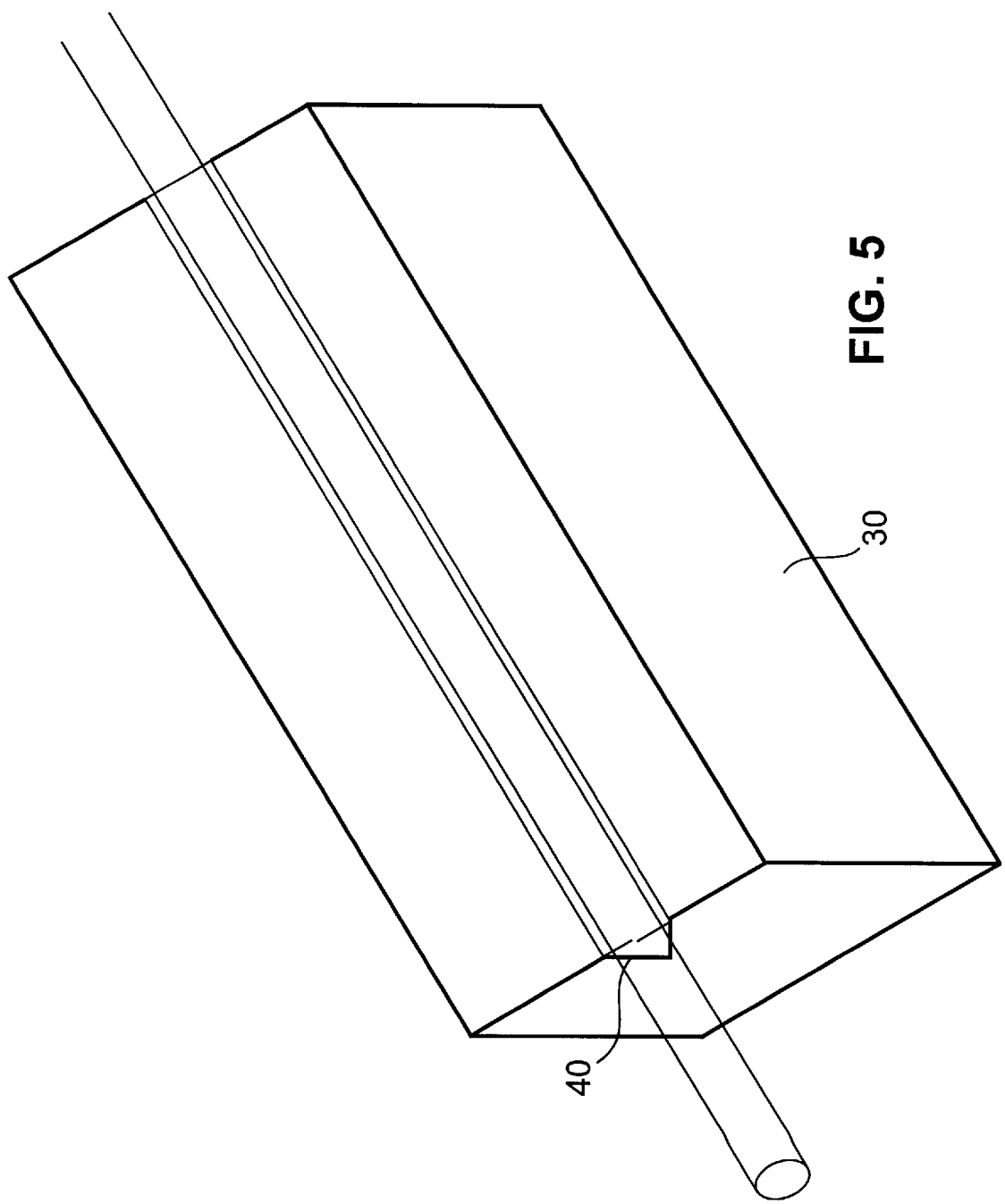
FIG. 5 is a schematic illustration of a temperature compensated device in accordance with a second embodiment of the present invention.

A second embodiment of the optical device of the invention is shown in FIG. 5. The compensating member 30 has a groove 40 on one of its surfaces. The fiber Bragg grating of the optical fiber is placed inside the groove. The groove is made in a direction which has a predetermined angle with respect to an anisotropic crystal axis for temperature compensation. The groove takes the form of a V-groove, a rectangular groove, or a rounded groove. The rounded groove is the best for maximizing strength of the compensating member. It is well known that grooves with small radii of curvature in brittle materials lead to loss of strength of the material. The strength reduction of substrate by the groove is reduced by cutting the crystal, so that the thermal expansion property of the crystal matches the fiber and the bonding adhesive. By doing this, one can reduce the amount of stress created from thermal expansion mismatches and improve the substrate overall strength and durability.

Figure 6:
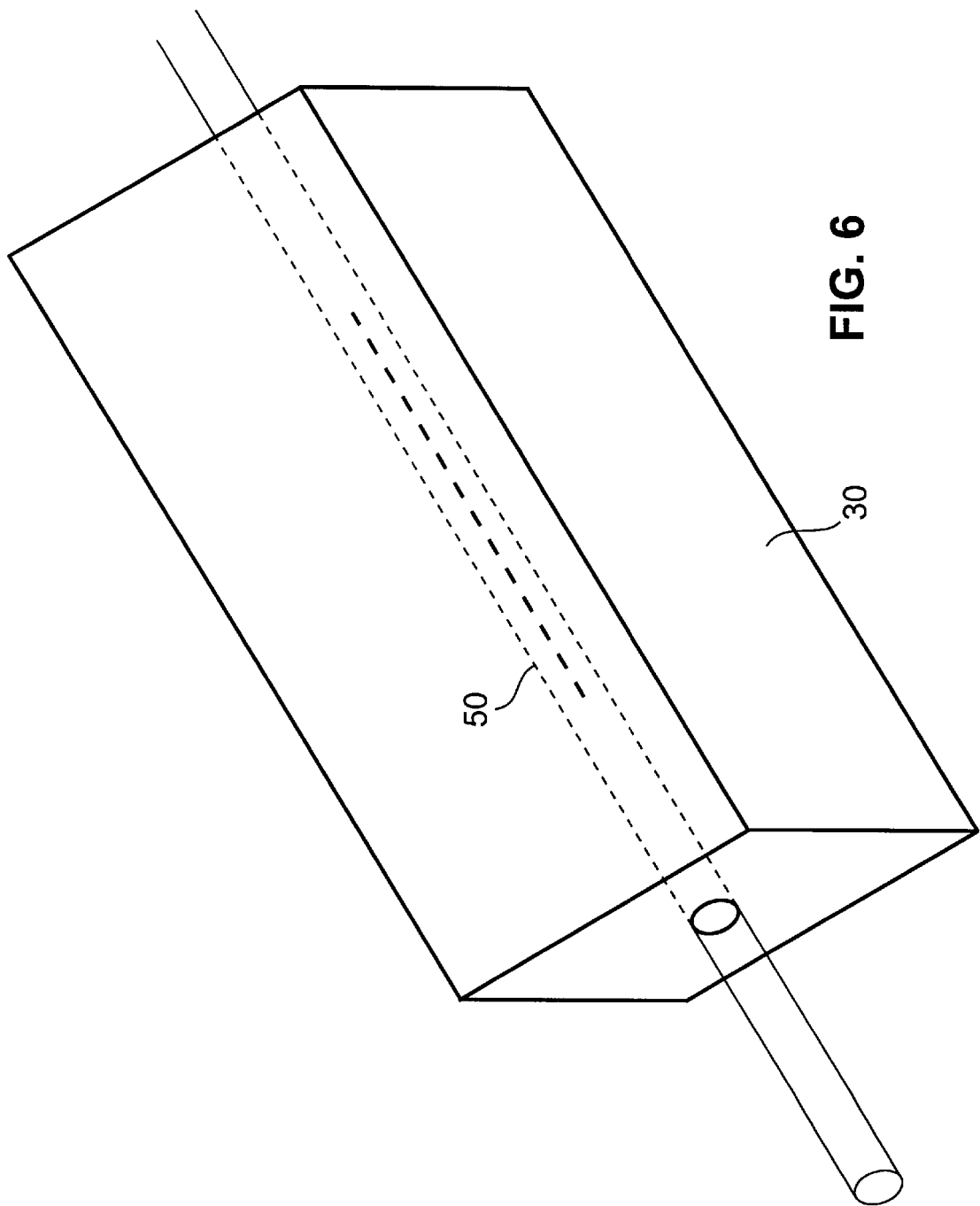
FIG. 6 is a schematic illustration of a temperature compensated device in accordance with a third embodiment of the present invention.

A third embodiment of the temperature compensated optical device of the invention is shown in FIG. 6. A hole 50 is drilled in the compensating member along a direction having a predetermined angle with respect to an axis of negative thermal expansion coefficient. The optical fiber with the grating is bonded to the compensating member in the hole.

Figure 7:
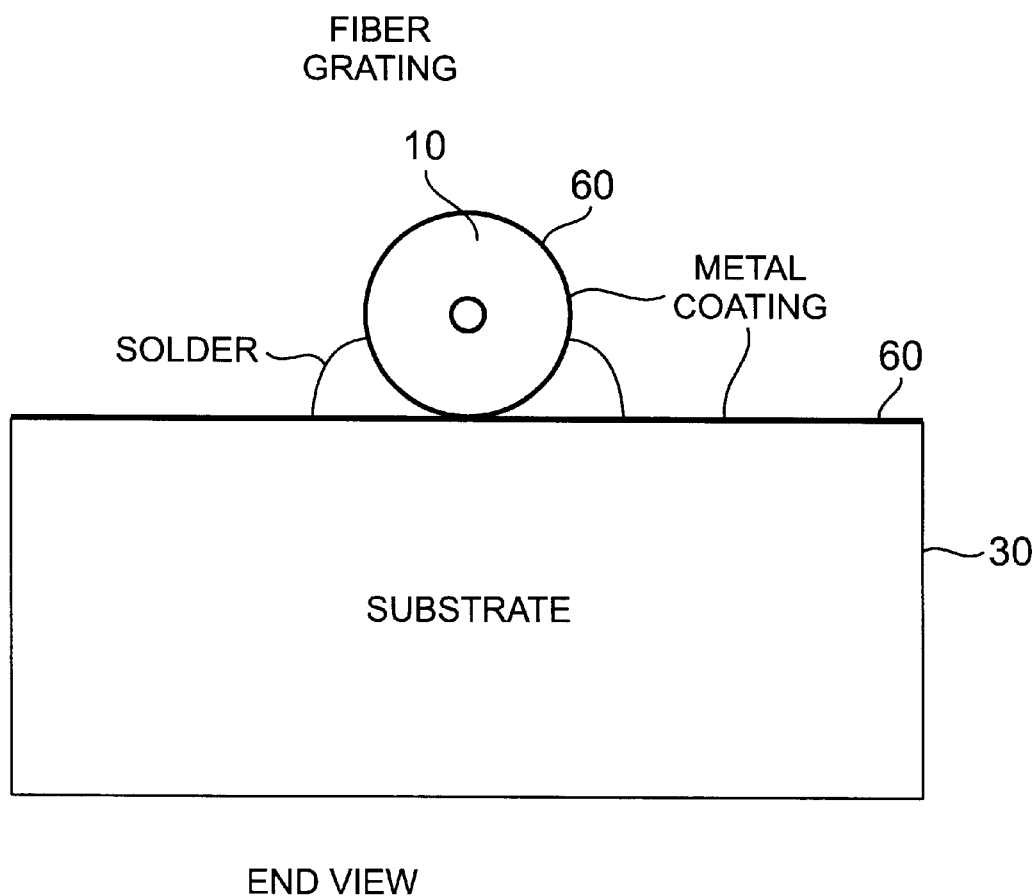
FIG. 7 is a schematic illustration of a temperature compensated device in accordance with a fourth embodiment of the present invention.
Figure 7:
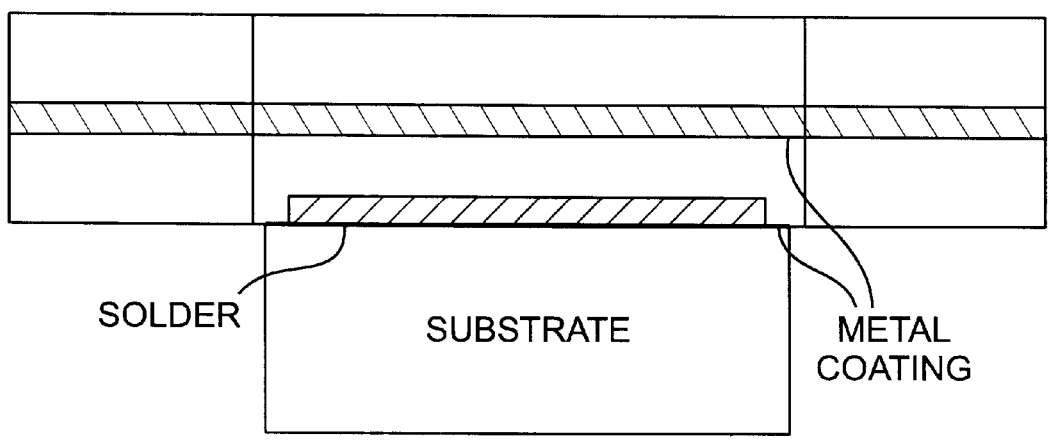

A fourth embodiment of the temperature compensated optical device of the invention is shown in FIG. 7. In this configuration, the surface of the compensating member and the fiber Bragg grating is coated with a metal coating 60 which is solderable. The compensating member and fiber grating can be metalized using a gold layer over a nickel layer by conventional wet deposition methods. The nickel layer adheres well to the glass surface and the gold adheres well to the solder. Compatible solder for this system is an indium-based solder, which melts at a low temperature. Metal coatings should be made thin to enable good strain transfer and to minimize thermal expansion mismatch between materials.

A fifth embodiment of the temperature compensated optical device of the invention has a similar physical configuration to that disclosed in FIG. 6. In this configuration, the surface of the compensating member and the fiber Bragg grating is coated with a low melting temperature glass frit.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A temperature compensated optical device comprising:
   an optical fiber having a grating therein for reflecting light passing therethrough within a range about a central wavelength;
   a temperature compensating member affixed to said optical fiber proximate said grating, said temperature compensating member being comprised of an anisotropic material having a negative temperature expansion coefficient along at least one axis thereof, wherein said optical fiber is aligned at a predetermined non-zero angle with respect to said axis to compensate a temperature variation.

2. The temperature compensated optical device according to claim 1, wherein said grating is a fiber Bragg grating with a central wavelength at 1536.310 nm.

3. The temperature compensated optical device according to claim 1, wherein said temperature compensating member comprises an anisotropic crystal.

4. The temperature compensated optical device according to claim 3, wherein said anisotropic crystal is calcite.

5. The temperature compensated optical device according to claim 3, wherein said anisotropic crystal is AgGaS.

6. The temperature compensated optical device according to claim 3, wherein said anisotropic crystal is AgGaSe.

7. The temperature compensated optical device according to claim 4, wherein said predetermined angle is between 0~10 degrees along the direction in the calcite crystal that has a compensating thermal expansion value for a given fiber Bragg grating.

8. The temperature compensated optical device according to claim 4, wherein said predetermined angle is 0.3 degrees along the direction in the calcite crystal that has a compensating thermal expansion value for a given fiber Bragg grating.

9. The temperature compensated optical device according to claim 1, wherein said central wavelength of said temperature compensated optical device remains substantially unchanged as the temperature of said grating varies from −40° C. to 170° C.

10. The temperature compensated optical device according to claim 1, wherein said central wavelength of said temperature compensated optical device remains substantially unchanged as the temperature of said grating varies from 24° C. to 170° C.

11. The temperature compensated optical device according to claim 1, wherein said optical fiber is bonded to said compensating member by epoxy.

12. The temperature compensated optical device according to claim 1, wherein said compensating member has a groove on one of its surfaces, said groove is oriented along said predetermined angle with respect to said axis, and said optical fiber is placed inside said groove.

13. The temperature compensated optical device according to claim 12, wherein said groove is a V-groove.

14. The temperature compensated optical device according to claim 12, wherein said groove is a rectangular groove.

15. The temperature compensated optical device according to claim 12, wherein said groove is a rounded groove.

16. The temperature compensated optical device according to claim 1, wherein said compensating member has a through hole therein oriented along said predetermined angle with respect to said axis, and said optical fiber is placed inside said hole.

17. The temperature compensated optical device according to claim 1, wherein said optical fiber is bonded on said compensating member by a metal coating layer.

18. A method of compensating for wavelength variations caused by temperature variations in an optical device comprising an optical fiber having a grating therein for reflecting light passing therethrough within a range about a central wavelength, said method comprising the steps of:
affixing a temperature compensating member to said optical fiber proximate said grating, wherein said compensating member comprises an anisotropic material having a negative temperature expansion coefficient along at least one axis thereof; and
aligning said optical fiber at a predetermined non-zero angle with respect to said axis to compensate temperature variations.

19. The method of compensating for wavelength variations according to claim 18, wherein said grating is a fiber Bragg grating with a central wavelength at 1536.310 nm.

20. The method of compensating for wavelength variations according to claim 18, wherein said temperature compensating member comprises an anisotropic crystal.

21. The method of compensating for wavelength variations according to claim 20, wherein said anisotropic crystal is calcite.

22. The method of compensating for wavelength variations according to claim 21, wherein said predetermined angle is between 0~10 degrees along the direction in the calcite crystal that has a compensating thermal expansion value for a given fiber Bragg grating.

23. The method of compensating for wavelength variations according to claim 21, wherein said predetermined angle is 0.3 degrees along the direction in the calcite crystal that has a compensating thermal expansion value for a given fiber Bragg grating.

24. The method of compensating for wavelength variations according to claim 18, wherein said central wavelength of said temperature compensated optical device remains substantially unchanged as the temperature of said grating varies from −40° C. to 170° C.

25. The method of compensating for wavelength variations according to claim 18, wherein said central wavelength of said temperature compensated optical device remains substantially unchanged as the temperature of said grating varies from 24° C. to 170° C.

26. The method of compensating for wavelength variations according to claim 18, wherein said optical fiber is affixed to said compensating member by epoxy.

27. The method of compensating for wavelength variations according to claim 18, wherein said affixing step comprises
providing a groove on one of surfaces of said compensating member oriented along said predetermined angle with respect to said axis; and
Placing said optical fiber inside said groove.

28. The method of compensating for wavelength variations according to claim 27, wherein said groove is a V-groove.

29. The method of compensating for wavelength variations according to claim 27, wherein said groove is a rectangular groove.

30. The method of compensating for wavelength variations according to claim 27, wherein said groove is a rounded groove.

31. The method of compensating for wavelength variations according to claim 18, wherein said affixing step comprises
providing a through hole in said compensating member to be oriented along said predetermined angle with respect to said axis; and
placing said optical fiber said hole.

32. The method of compensating for wavelength variations according to claim 18, wherein said affixing step comprises
bonding said optical fiber to said compensating member by a metal coating layer and a solder.

33. The method of compensating for wavelength variations according to claim 18, wherein said affixing step comprises
bonding said optical fiber to said compensating member by a low melting temperature glass frit.

\* \* \* \* \*